(12) United States Patent
Melchin et al.

(10) Patent No.: US 11,220,783 B2
(45) Date of Patent: Jan. 11, 2022

(54) BINDER FOR CARPET COATING COMPOSITIONS

(71) Applicant: Wacker Chemie AG, Munich (DE)

(72) Inventors: Timo Melchin, Mehring (DE); Gerhard Kögler, Burgkirchen (DE); Holger Künstle, Burghausen (DE)

(73) Assignee: Wacker Chemie AG, Munich (DE)

( * ) Notice: Subject to any disclaimer, the term of this patent is extended or adjusted under 35 U.S.C. 154(b) by 70 days.

(21) Appl. No.: 15/776,302

(22) PCT Filed: Nov. 9, 2016

(86) PCT No.: PCT/EP2016/077030
§ 371 (c)(1),
(2) Date: May 15, 2018

(87) PCT Pub. No.: WO2017/089127
PCT Pub. Date: Jun. 1, 2017

(65) Prior Publication Data
US 2018/0327966 A1    Nov. 15, 2018

(30) Foreign Application Priority Data

Nov. 24, 2015 (DE) ...................... 10 2015 223 233.6

(51) Int. Cl.
| | | |
|---|---|---|
| *D06N 7/00* | (2006.01) | |
| *C08J 7/04* | (2020.01) | |
| *C09D 123/08* | (2006.01) | |
| *C09D 179/02* | (2006.01) | |

(52) U.S. Cl.
CPC .......... *D06N 7/0073* (2013.01); *D06N 7/0063* (2013.01); *D06N 7/0086* (2013.01); *C08J 7/0427* (2020.01); *C09D 123/0853* (2013.01); *C09D 179/02* (2013.01); *D06N 2203/045* (2013.01); *D06N 2203/06* (2013.01); *D06N 2203/061* (2013.01)

(58) Field of Classification Search
CPC ............ C09D 123/0853; C09D 179/02; B32B 2471/00; C08J 7/0427; D06N 7/0073
See application file for complete search history.

(56) References Cited

U.S. PATENT DOCUMENTS

| | | | |
|---|---|---|---|
| 4,126,415 A | 11/1978 | Coiner et al. | |
| 4,148,781 A * | 4/1979 | Narukawa | C04B 26/04 156/39 |
| 4,446,274 A * | 5/1984 | Okazaki | C09J 131/04 524/812 |
| 5,264,467 A | 11/1993 | DiStefano | |
| 6,359,076 B1 | 3/2002 | Lunsford et al. | |
| 2006/0292952 A1* | 12/2006 | Xing | C08L 79/02 442/172 |
| 2011/0268933 A1* | 11/2011 | Hahn | B32B 5/26 428/195.1 |
| 2014/0087120 A1* | 3/2014 | Sagl | C08F 2/22 428/96 |

FOREIGN PATENT DOCUMENTS

| | | |
|---|---|---|
| DE | 69201426 T2 | 6/1995 |
| WO | 2014031579 A2 | 2/2014 |
| WO | 2014052143 A1 | 4/2014 |
| WO | 2014070818 A1 | 5/2014 |

OTHER PUBLICATIONS

Brandrup et al., "Polymer Handbook" Second Edition, J. Wiley & Sons, New York, NY, 1975—58 pages.
Fox, T., "Influence of Diluent and of Copolymer Composition on the Glass Temperature of a Polymer System", American Physics Society, vol. 1, No. 3, 1956—1 page.
International Search Report and Written Opinion for International Application No. PCT/EP2016/077030, dated Feb. 21, 2017—7 pages.
International Preliminary Report on Patentability for International Application No. PCT/EP2016/077030, dated Oct. 11, 2017, 7 pages.

* cited by examiner

*Primary Examiner* — Gregory Listvoyb
(74) *Attorney, Agent, or Firm* — RatnerPrestia

(57) ABSTRACT

The object of the invention is the use of an aqueous dispersion of a vinylacetate-ethylene-copolymer and of at least one polyethylene imine as a binder in a carpet coating composition for the production of carpets.

8 Claims, No Drawings

BINDER FOR CARPET COATING COMPOSITIONS

CROSS-REFERENCE TO RELATED APPLICATIONS

This application is a U.S. National Stage filing under 35 U.S.C. § 371 of International Application No. PCT/EP2016/077030, filed 9 Nov. 2016, claiming priority under 35 U.S.C. § 119 to German Patent Application No. DE 10 2015 223 233.6, filed 24 Nov. 2015, the entire contents of which are incorporated herein by reference.

FIELD OF INVENTION

The invention relates to binders for carpet coating compositions, to carpet coating compositions obtainable therewith, and to carpets coated with such carpet coating compositions.

BACKGROUND

Typical, commercially available carpets, as for example continuous-sheeting product or carpet tiles, are manufactured by forming the carpet pile from tufts mechanically inserted, in the form for example of loops, into a woven or laid primary-backing. In tufted carpets, the sheetlike primary backing holds the loops but loosely, and the loops are therefore treated with a binder-containing formulation (carpet coating composition) to stabilize the unfinished carpet. Said binder-containing formulation is precoated in a foamed or unfoamed state onto the reverse side of the primary backing, and, in addition to an aqueous polymeric dispersion as binder, typically further comprises fillers, such as chalk, for example, and optionally further adjuvants, such as thickeners, dispersing assistants or foaming assistants.

To improve their dimensional stability, the carpet products thus obtained may be provided with a further, secondary backing. The secondary backing generally comprises a woven fabric in a manufactured fiber, such as polypropylene, polyamide or polyester, or in a natural fiber, such as jute. The secondary backing is attached to the as-precoated carpet by again applying a binder, the formulation of which may be similar to that of the carpet precoat coating composition. Again, in this second coating, the aforementioned aqueous polymer dispersions, formulated as a foam or in an unfoamed state, may be applied together with fillers and farther adjuvants, such as thickeners, dispersing assistants or foaming assistants, to form a secondary coating.

Vinyl acetate-ethylene copolymers—whether with pure protective colloid stabilization, with pure emulsifier stabilization, or with mixed stabilization—are increasingly being used as binders in carpet coating compositions. These copolymers, with varying glass transition temperature and hence varying ethylene fraction in the copolymer, are notable for good mechanical properties in the fully finished carpet. Not only tuft withdrawal forces but also delamination resistances can be formulated comparably with standard binders based on styrene-butadiene copolymer dispersions under dry testing conditions. The mechanical tests after water storage, as model testing for carpet exposure to cleaning and moisture, however, often show lower values than carpet coating composition based on styrene-butadiene latex.

Causes of a slump in the profiles of properties may lie in the porosity of the coating, the resultant pore size distribution, the hydrophilicity of the binder, the filler distribution itself, and the cohesiveness and adhesiveness of the binder relative to the constituents of the carpet construction (pile and coating on secondary backing). In the case of a high porosity and a broad pore size distribution, originating from the foam application of the carpet coating composition, the capillary water absorption of the coating material is also high, and the associated weakening of the coating results in a reduction in the cohesion and, as a consequence, to the premature breakage or tearing under mechanical load. The capillary water absorption can be reduced or optimized through a skillful choice of the formulation constituents and the application parameters. This does nor alter the loss of adhesion under water storage. The lower adhesion is manifested particularly in the loss of mechanical strength on measurements of the delamination resistances.

In U.S. Pat. No. 6,359,076 B1, carpets with improved wet strength are obtained with a secondary-backing coating composition based on an aqueous dispersion of a vinyl acetate-ethylene copolymer with OH-functional comonomer units, in combination with a crosslinking agent from the group of polyfunctional aziridines, polyfunctional isocyanates, and polyfunctional epoxides.

WO 2014/031579 A2 proposes improving the wet strength of carpets by using a secondary-backing coating composition which is based on a vinyl acetate-ethylene copolymer dispersion and is modified with an ethylene-acrylic acid copolymer, optionally with addition of crosslinker.

WO 2014/052143 A1 describes aqueous vinyl acetate-ethylene copolymer dispersions which in a secondary-backing coating composition lead to an improvement in the wet strength of carpets treated therewith. This is achieved by stabilizing the copolymer dispersion using a mixture of partially hydrolyzed and fully hydrolyzed polyvinyl alcohol with in each case a high Hoeppler viscosity.

From U.S. Pat. No. 4,126,415 it is known that polyethyleneimines are suitable for providing carpets with an antistatic finish. For that purpose the carpet fibers are subjected to electrical spark discharge, then sprayed with an aqueous solution of a polyethyleneimine salt, and subsequently dried. WO 2014/070818 A1 discloses 2-component primer compositions which comprise in one component A) a vinyl acetate-ethylene copolymer, an acrylate tackifier and polyethyleneimine, and in the second component B) comprise epoxy resin.

SUMMARY

The problem addressed was that of providing a carpet coating material composition based on an aqueous vinyl acetate-ethylene copolymer dispersion which leads to an improvement in the mechanical strengths of the carpet after water storage, when it is used to produce carpets, without the need for the copolymerization of functional comonomers or for the use of specialty stabilizer systems.

The invention provides for the use of an aqueous dispersion of a vinyl acetate-ethylene copolymer, and of at least one polyethyleneimine, as binders in a carpet coating composition for producing carpets.

DETAILED DESCRIPTION

Suitable polyethyleneimines are polymers having the repeating structural unit —$CH_2$—$CH_2$—NH— and having a weight-average molecular weight (determined by GPC) of preferably 500 to 1 000 000 g/mol, more preferably 10 000 to 1 000 000 g/mol. Polyethyleneimines of this kind are available commercially, under the tradename Lupasol® from BASF SE, for example. The polyethyleneimines are included in the carpet coating composition in an amount of 0.1 to 10 wt %, preferably 0.5 to 5 wt %, based in each case on the dry weight of the vinyl acetate-ethylene copolymer (dry/dry).

The vinyl acetate-ethylene copolymer is obtained by radically initiated emulsion polymerization of 60 to 98% of vinyl acetate and 2 to 30 wt % of ethylene, preferably 75 to 95 wt % of vinyl acetate and 5 to 25 wt % of ethylene, based in each case on the total weight of the monomers, in an aqueous medium. It is further possible, optionally, to copolymerize up to 10 wt %, preferably 0.1 to 10 wt %, of further comonomers, based in each case on the total weight of the monomers. The particulars in wt % for the comonomers add up to 100 wt % in each case.

Suitable further comonomers are those from the group of vinyl esters having 3 to 12 carbon atoms in the carboxylic acid radical, such as vinyl propionate, vinyl laurate, vinyl esters of alpha-branched carboxylic acids having 8 to 11 carbon atoms such as VeoVa®EH, VeoVa®9 or VeoVa®10 (tradenames of Resolution). Also suitable are methacrylic esters or acrylic esters of unbranched or branched alcohols having 1 to 15 carbon atoms, such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Also suitable are vinyl halides such as vinyl chloride.

Other suitable further comonomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride, ethylenically unsaturated sulfonic acids and/or their salts, preferably vinylsulfonic acid, 2-acrylamido-2-methyl-propanesulfonic acid. Further examples are precrosslinking comonomers such as polyethylenically unsaturated comonomers, as for example divinyl adipate, diallyl maleate, allyl methacrylate or triallyl cyanurate, or postcrosslinking comonomers, as for example acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide or of N-methylolmethacrylamide and of N-methylolallylcarbamate. Also suitable are monomers with hydroxyl or carboxyl groups, such as, for example, methacrylic and acrylic hydroxyalkyl esters such as hydroxyethyl, hydroxypropyl or hydroxybutyl acrylate or methacrylate, and also 1,3-dicarbonyl compounds such as acetoacetoxyethyl acrylate, acetoacetoxypropyl methacrylate, acetoacetoxyethyl methacrylate, ancetoacetoxybutyl methacrylate, 2,3-di(acetoacetoxy)propyl methacrylate, and allyl acetoacetate.

Other suitable further comonomers are comonomers with epoxide functionality such as glycidyl methacrylate, glycidyl acrylate, allyl glycidyl ether, vinyl glycidyl ether. Further examples of suitable further comonomers are comonomers with silicon functionality, such as acryloyloxypropyltri(alkoxy)- and methacryloyloxypropyltri(alkoxy)-silanes, vinyltrialkoxysilanes and vinylmethyldialkoxysilanes, preferably with alkyl and/or alkoxy groups having in each case 1 to 2 carbon atoms, as for example vinyltrimethoxysilane, vinyltriethoxysilane, 3-methacryloyloxypropyltrimethoxysilane.

With particular preference no further comonomers are copolymerized.

The monomer selection is made such that the vinyl acetate-ethylene copolymer generally has a glass transition temperature Tg of −20 to +20° C. The glass transition temperature Tg of the polymers can be determined in a known way of DSC (Differential Scanning Calorimetry, DIN EN ISO 11357-1/2). The Tg may also be calculated approximately in advance using the Fox equation. According to Fox T. G., Bull. Am. Physics Soc. 1, 3, page 123 (1956), $1/Tg=x1/Tg1+x2/Tg2+\ldots+xn/Tgn$, where xn is the mass fraction (wt %/100) of the monomer n, and Tgn is the glass transition temperature, in kelvins, of the homopolymer of the monomer n. Tg values for homopolymers are listed in Polymer Handbook 2nd Edition, J. Wiley & Sons, New York (1975).

The vinyl acetate-ethylene copolymer is prepared in a known way, preferably by radically initiated emulsion polymerization in water. The polymerization temperature is 40° C. to 120° C. preferably 60° C. to 90° C. In the case of copolymerization of gaseous comonomers, such as ethylene, preference is given to working under pressure, in general at between 5 bar and 120 bar. The polymerization may be initiated using the initiators customary for emulsion polymerization, such as hydroperoxide or tert-butyl hydroperoxide, or using redox initiator combinations, with reducing agents, such as (iso)ascorbic acid or Na hydroxymethanesulfinate (Brüggolite FF). Substances with a regulating action can be used during the polymerization in order to control the molecular weight.

The vinyl acetate-ethylene copolymer is polymerized in the presence of protective colloid or in the presence of emulsifier, or in the presence of a combination of protective colloid and emulsifier.

Customary protective colloids for stabilizing the polymerization batch include, for example, partially or fully hydrolyzed polyvinyl alcohols; polyvinylpyrrolidones; polyvinyl acetals; polysaccharides in water-soluble form such as starches, celluloses or their derivatives, such as carboxymethyl, methyl, hydroxyethyl or hydroxypropyl derivatives; proteins such as casein or caseinate, soy protein, gelatin; lignosulfonates; synthetic polymers such as poly(meth)acrylic acid, copolymers of (meth)acrylates with carboxylfunctional comonomer units, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers.

Preference is given to celluloses or derivatives thereof, or partially hydrolyzed polyvinyl alcohols having an 80 to 95 mol % degree of hydrolysis and a Hoeppler viscosity in 4% aqueous solution of 1 to 40 mPas, especially 3 to 30 mPas (Hoeppler method at 20° C., DIN 53015). Particular preference is given to low molecular weight partially hydrolyzed polyvinyl alcohols each having a preferably 80 to 95 mol %, more preferably 85 to 90 mol % and most preferably 87 to 89 mol % degree of hydrolysis and a Hoeppler viscosity of in each case preferably 1 to 5 mPas and more preferably 2 to 4 mPas (as determined to DIN 53015, Hoeppler method, at 20° C., in 4% aqueous solution.

It is optionally also possible to use partially hydrolyzed high molecular weight polyvinyl alcohols having a hydrolysis degree of preferably 80 to 95 mol % and a Hoeppler viscosity, in 4% aqueous solution, of preferably >5 to 40 mPas, more preferably 8 to 40 mPas (DIN 53015 Hoeppler method at 20° C.) in admixture with the partially hydrolyzed low molecular weight polyvinyl alcohols. It is optionally also possible to use fully hydrolyzed high molecular weight polyvinyl alcohols having a hydrolysis degree of preferably 96 to 100 mol %, especially 98 to 100 mol %, and a Hoeppler visocosity, in 4% aqueous solution, of preferably 10 to 56 mPas (DIN 53015 Hoeppler method at 20° C.) in admixture with the partially hydrolyzed low molecular weight polyvinyl alcohols. The partially hydrolyzed high molecular weight polyvinyl alcohols and/or the fully hydrolyzed high molecular weight polyvinyl alcohols are each employed here in an amount of 0.1 to 4 wt %, all based on the total weight of the comonomers.

Preference is also given to modified polyvinyl alcohols, hereinafter also referred to as X-PVOH, having a hydrolysis degree of 80 to 99.9 mol %, preferably 85 to 95 mol %, and a Hoeppler viscosity, in 4% aqueous solution, of 1 to 30 mPas (as determined to DIN 53015 at 20° C.) Examples thereof are polyvinyl alcohols earing functional groups, such as acetoacetyl groups. Preference is also given to the so-called E-PVOH polyvinyl alcohols, which contain ethylene units and are known, for example, by the trade name of EXCEVAL®. E-PVOHs are partially or preferably fully hydrolyzed copolymers of vinyl acetate and ethylene. Preferred E-PVOHs have an ethylene content of 0.1 to 12 mol %, preferably 1 to 7 mol %, more preferably 2 to 6 mol % and especially 2 to 4 mol %. The mass-average degree of polymerization is in the range from 500 to 5000, preferably in the range from 2000 to 4500 and more preferably in the range from 3000 to 4000. The hydrolysis degree is generally greater than 92 mol %, preferably in the range from 94.5 to 99.9 mol % and more preferably in the range from 98.1 to 99.5 mol %.

The protective colloids are commercially available and are obtainable using methods known to a person skilled in the art. It is also possible to use mixtures of said protective colloids. The polymerization is preferably carried out in the presence of altogether 2 to 10 wt % of protective colloid, more preferably altogether 5 to 10 wt %, all based on the total weight of the comonomers.

It is preferably nonionic emulsifiers which are used to stabilize the dispersion. Ionic, preferably anionic, emulsifiers are also usable. Combinations of nonionic emulsifiers with anionic emulsifiers are also usable. The emulsifier quantity is generally in the range from 0.1 to 5.0 wt %, based on the total weight of the comonomers.

Suitable nonionic emulsifiers include, for example, acyl, alkyl, oleyl and alkylaryl ethoxylates. These products are commercially available as Genapol® or Lutensol® for example. They subsume ethoxylated mono-, di- and trialkylphenols, preferably with an ethoxylation degree of 3 to 50 ethylene oxide units and $C_4$ to $C_{12}$ alkyl moieties; and also ethoxylated fatty alcohols, preferably with an ethoxylation degree of 3 to 80 ethylene oxide units and $C_8$ to $C_{26}$ alkyl moieties. Suitable nonionic emulsifiers further include $C_{13}$-$C_{15}$ oxo process alcohol ethoxylates having an ethoxylation degree of 3 to 30 ethylene oxide units, $C_{16}$-$C_{18}$ fatty alcohol ethoxylates with an ethoxylation degree of 11 to 80 ethylene oxide units, $C_{10}$ oxo process alcohol ethoxylates with an ethoxylation degree of 3 to 11 ethylene oxide units, $C_{13}$ oxo process alcohol ethoxylates with an ethoxylation degree of 3 to 20 ethylene oxide units, polyoxyethylene sorbitan monooleate with 20 ethylene oxide groups, copolymers of ethylene oxide and propylene oxide with a minimum ethylene oxide content of 10 wt %, polyethylene oxide ethers of oleyl alcohol with an ethoxylation degree of 4 to 20 ethylene oxide units, and also the polyethylene oxide ethers of nonylphenol with an ethoxylation degree of 4 to 20 ethylene oxide units.

Particular preference is green to $C_{12}$-$C_{14}$ fatty alcohol ethoxylates with an ethoxylation degree of 3 to 30 ethylene oxide units.

Examples of suitable anionic emulsifiers include the sodium, potassium and ammonium salts of linear aliphatic carboxylic acids having 12 to 20 carbon atoms; sodium hydroxyoctadecanesulfonate; the sodium, potassium and ammonium salts of hydroxyl fatty acids having 12 to 20 carbon atoms and their sulfonation and/or acetylation products; the sodium, potassium and ammonium salts of alkyl sulfates, including as triethanolamine salts, and one sodium, potassium and ammonium salts of alkylsulfonates having 10 to 20 carbon atoms each and of alkylarylsulfonates having 12 to 20 carbon atoms; dimethyldialkylammonium chloride having 8 to 18 carbon atoms in the alkyl moiety and sulfonation products thereof; the sodium, potassium and ammonium salts of sulfosuccinic esters with aliphatic saturated monohydric alcohols having 4 to 16 carbon atoms and of sulfosuccinic 4-ester with polyethylene glycol ethers of monohybric aliphatic alcohols having 10 to 12 carbon atoms, especially their disodium salts; the sodium, potassium and ammonium salts of sulfosuccinic 4-ester with polyethylene glycol nonylphenyl ether, especially its disodium salt; the sodium, potassium and ammonium salts of biscyclohexyl sulfosuccinate, especially its sodium salt; lignosulfonic acid and also its calcium, magnesium, sodium and ammonium salts; resin acids and also hydrogenated and dehydrogenated resin acids and also their alkali metal salts.

The polymerization is generally in each case carried out to a conversion of ≥95 wt %, preferably up to a conversion of from 95 to 99 wt %, for the monomers which are liquid under polymerization conditions.

The thereby obtainable aqueous dispersions of the vinyl acetate-ethylene copolymer each have a solids content of 30 to 75 wt %, preferably of 50 to 65 wt %. Suitable aqueous dispersions of vinyl acetate-ethylene copolymers are also commercially available; Vinnapas® dispersions from Wacker Chemie AG for example.

The invention further provides carpet coating compositions comprising an aqueous dispersion of a vinyl acetate-ethylene copolymer, and 0.1 to 10 wt % of at least one polyethyleneimine, based on the dry weight of the vinyl acetate-ethylene copolymer (dry/dry), and 100 to 1400 wt % of filler, based on the dry weight of the vinyl acetate-ethylene copolymer (dry/dry), water, optionally one or more additives, and optionally one or more adjuvants.

The solids content of the carpet costing compositions is preferably in the range from 72 to 83 wt % and more preferably in the range from 75 to 80 wt %, all based on the total weight of the carpet coating compositions. The carpet coating compositions have a Brookfield viscosity of preferably ≤7000 mPas, more preferably ≤3000 mPas (as measured with Brookfield RV measuring instrument with spindle 4, 20 rpm, at 25° C.) following admixture of fillers and in the absence of additives or adjuvants.

Suitable fillers include, for example, kaolin, talc, fluorspar, fly ash, aluminum trihydrate, preferably chalk.

Examples of additives are thickening agents, such as polyacrylates or cellulose ethers, or foaming auxiliaries. Foaming auxiliaries are preferably admixed for foam application. Thickening agents may be admixed to establish the target viscosity of the carpet coating compositions. The amount of thickening agents needed for this is generally in the range from 0.1 to 6 wt % and preferably in the range from 1 to 3 wt %, all based on the weight of the vinyl acetate-ethylene copolymer (dry/dry). It is preferably this method which is used to establish a Brookfield viscosity of 2000 to 10 000 mPas (measured with Brookfield RV measuring instrument using spindle 4, 20 rpm, at 25° C.). However, the procedure of the invention also makes it possible to eschew thickening agents.

Customary adjuvants include, for example, dispersants, wetting agents, pigments, hydrophobicizing agents or biocides, such as formaldehyde depot compounds, isothiazolinones, phenols or quaternary ammonium compounds. To optimize the formulation viscosity it is also possible to use organic acids such as citric acid. The carpet coating compositions are preferably free from plasticizers or film-forming assistants.

The carpet coating compositions contain from 100 to 1400 parts by weight of filler to 100 parts by weight of the vinyl acetate-ethylene copolymer (dry/dry). This is also referred to as a fill level of 100% to 1400%. The amount of filler in the formulation may vary according to the coating properties desired. The higher the filler fraction (fill level), the lower the mechanical properties are.

The precoat preferably utilizes carpet coating compositions having fill levels of 300 to 1400%. Fill levels are particularly preferably in the range from 600 to 1000% for precoats for residential applications and from 300 to 600% for commercial applications, such as offices, hotels or ships.

The secondary coating preferably utilizes carpet coating compositions with fill levels of 275 to 600% for residential applications and 200 to 275% for commercial applications, such as offices, hotels or ships.

In a possible procedure for producing the carpet coating compositions, the aqueous dispersion of the vinyl acetate-ethylene copolymer and the polyethyleneimine fraction are mixed and then the fillers are stirred in. It is also possible to proceed by adding the polyethyleneimine fraction to the polymerization mixture even before or during or after the polymerization of vinyl acetate and ethylene.

Any additives and adjuvants may generally be admixed to the carpet coating composition at any stage, preferably before admixture of fillers. The established carpet coating composition production equipment with which a person skilled in the art is familiar is suitable for producing the carpet coating compositions.

The invention further provides carpets coated with one or more carpet coating compositions of the invention in the precoat and/or secondary coating.

The carpet coating compositions are advantageously employable using existing processes in existing installations for carpet manufacture.

The carpet coating compositions are suitable for consolidation of carpets, for example continuous-sheeting produces or carpet tiles. The carpet coating compositions ate used in the manufacture of tufted carpets, woven carpets or needlefelt carpets.

The examples which follow serve to further elucidate the invention:

Methods:

Determination of Glass Transition Temperature Tg:

The glass transition temperature Tg of polymers was determined via DSC (differential scanning calorimetry, DIN EN ISO 11357-1/2) using a DSC 1 differential scanning calorimeter from Mettler-Toledo in an open crucible at a heating rate of 10 K/min. The glass transition temperature was taken to be the temperature at the midpoint of the second heating curve (midpoint=half the step height).

Determination of Brookfield Viscosity:

The Brookfield viscosities of the aqueous polymeric dispersions were determined to EN ISO 2555 using a Brookfield EV viscometer, after conditioning to the reported temperature, by using the particular spindle reported at the reported number of revolutions per minute. The viscosity is reported in mPas.

Determination of Particle Size Dw:

The average particle diameter Dw is determined using a Beckmann Coulter® LS measuring instrument to ISO 13320.

Preparation of Aqueous Vinyl Acetate-Ethylene Copolymer Dispersions

Dispersion A (A):

A nitrogen-purged 572 liter pressure reactor was initially charged with the following components:

125.2 kg of deionized water, 56.0 kg of a 20 wt % aqueous solution of a polyvinyl alcohol having an average hydrolysis degree of 88 mol % and a Hoeppler viscosity of 4 mPas (as determined to DIN 53015, at 20° C., in 4% aqueous solution), 28.1 kg of a 25 wt % aqueous solution of a fatty alcohol ethoxylate having an average ethoxylation degree of 30 mol EO units, 241.7 kg of vinyl acetate, 0.48 kg of a 1.0 wt % aqueous ammonium iron sulfate solution.

The initial charge was adjusted to pH 4.0 using 250 mL of formic acid (98 wt %).

Under agitation (stirring at 240 rpm), the initial charge was heated to 35° C. and injected with ethylene up to a pressure of 30 bar. On reaching the temperature of 35° C. and a pressure of 30 bar, the initiator feeds—consisting of an aqueous 3.5 wt % hydrogen peroxide solution and an aqueous 10 wt % sodium isoascorbate solution—were each started at 700 g/h. Once the reaction had started (10 minutes after the start of the initiator feeding), as was clearly apparent from the increase in the reactor internal temperature, the evolving heat of reactions lifted the reactor internal temperature to 85° C. Concurrently, at 10 minutes after the reaction had begun, a vinyl acetate feed was started at 35.1 kg/h (feed time 120 min, 70.2 kg). On reaching a reactor internal temperature of 80° C., ethylene was reinjected up to a target pressure of 58 bar until a total ethylene quantity of 52.8 kg had been added.

On completion of the vinyl acetate feeds, the initiator feeds were each continued at 2000 g/h for a further 30 minutes, during which the pressure decreased to 20 bar. The batch was subsequently cooled down to 70° C. and transferred into a "pressureless" flow pressure) reactor and post-polymerized therein at a pressure of 700 mbar abs. by admixture of 2.6 kg of tert-butyl hydroperoxide solution (10 wt % in water) and 2.6 kg of sodium isoascorbate solution (10 wt % in water).

Solids content: 63 wt %

Brookfield viscosity: 1300 mPas (spindle 2, 20 rpm, 23° C.)

Particle size: Dw 1.0 μm, (Coulter LS)

Glass transition temperature: 7.0° C. (DSC)

Protective colloid: 3.1 wt %, based on comonomers

Emulsifier: 1.8 wt %, based on comonomers

Dispersion B (B):

A nitrogen-purged 590 L pressures reactor was initially charged with the following components:

134.9 kg of deionized water, 75.9 kg of a 20 wt % aqueous solution of a polyvinyl, alcohol having an average hydrolysis degree of 88 mol % and a Hoeppler viscosity of 4 mPas (as determined to DIN 53015, at 20° C., in 4% aqueous solution), 12.5 kg of a 10 wt % aqueous solution of a polyvinyl alcohol having an average hydrolysis degree of 88 mol % and a Hoeppler viscosity of 23-26 mPas (as determined to DIM 53015, at 20° C., in 4% aqueous solution),
224 kg of vinyl acetate,
0.48 kg of a 1.0 wt % aqueous ammonium iron sulfate solution.

The initial charge was adjusted with 250 mL of formic acid (98 wt %) to pH 4.0.

Under agitation (stirring at 240 rpm), the initial charge was heated up to 55° C. and ethylene was injected up to a pressure of 20 bar. On reaching the temperature of 55° C. and a pressure of 20 bar, the initiator feeds—consisting of an aqueous 3 wt % tert-butyl hydroperoxide solution and an aqueous 5 wt % ascorbic acid solution—were each started at 700 g/h. Once the reaction had started, as was clearly indicated by the increase in the reactor internal temperature, the evolving heat of reaction raised the reactor internal temperature to 90° C. and the pressure to 48 bar. The initiator feeds were both reduced to 350 g/h to police the reaction heat.

45 minutes after the reaction had begun, a vinyl acetate feed and a polyvinyl alcohol feed were started. Vinyl acetate was fed into the reactor over 90 minutes at a rate of 40 kg/h (=60 kg of vinyl acetate), while the polyvinyl alcohol—consisting of a 10 wt % aqueous solution of a polyvinyl alcohol having an average hydrolysis degree of 88 mol % and a Hoeppler viscosity of 4 mPas (as determined to DIN 53015, at 20° C., in 4% aqueous solution)—was added over 120 minutes at a rate of 14 kg/h (=28.0 kg of aqueous polyvinyl alcohol solution). Ethylene was reinjected during the polymerization at a target pressure of 44 bar until a total ethylene quantity of 34 kg had been injected.

On completion of the feeds, the initiator feeds were each continued for a further 30 minutes at 1300 g/h, during which the pressure decreased to 20 bar. The batch was subsequently cooled down to 65° C. and transferred into a "pressureless" (low pressure) reactor and postpolymerized therein at a pressure of 700 mbar abs. by admixture of 1 kg of tert-butyl hydroperoxide solution (10 wt % in water) and 2 kg of ascorbic acid solution (5 wt % in water).
Solids content: 58 wt %
Brookfield viscosity: 1800 mPas (spindle 2, 20 rpm, 23° C.)
Particle size: Dw 1.0 μm, (Coulter LS)
Glass transition temperature: 15.0° C. (DSC)
Protective colloid: 6.2 wt %, based on comonomers
Dispersion C (C):

A procedure analogous to that for the preparation of dispersion B was adopted, with the difference that only one polyvinyl alcohol was included in the initial charge, specifically 94.0 kg of a 20 wt % aqueous solution of a polyvinyl alcohol having an average hydrolysis degree of 88 mol % and a Hoeppler viscosity of 4 mPas (as determined to DIN 53015, at 20° C., in 4% aqueous solution) and that no polyvinyl alcohol was fed in, and the vinyl acetate and ethylene quantities were selected so as to obtain a copolymer with 77 wt % of vinyl acetate and 23 wt % of ethylene.
Solids content: 52.5 wt %
Brookfield viscosity: 210 mPas (spindle 1, 20 rpm, 23° C.)
Particle size: Dw 1.0 μm, (Coulter LS)
Glass transition temperature: −7.0° C. (DSC)
Protective colloid: 6.4 wt %, based on comonomers
Preparation of Carpet Coating Compositions:
Formulation 1 (F1):

Dispersions A to C were used to prepare carpet coating compositions on the basis of the following general formula: 100 parts by weight of the particular dispersion (polymer dry),
X parts by weight of polyethyleneimine, type and amount as reported in the example,
450 parts by weight of chalk (Carbocia 80, Carbocia) (filler),
0.5 part by weight of foaming assistant (sodium laurylsulfate).

The particulars in parts by weight are based on the dry weight of the particular carpet coating composition.

Additional water was added in an amount so as to obtain carpet coating compositions having a solids content of 81.5 wt %.

The carpet coating compositions were prepared by initially charging the water and the particular dispersions and the particular polyethyleneimine and under agitation admixing the filler and thereafter the foaming assistant.

The carpet coating compositions had a solids content of 81.5 wt % and a fill level of 450 wt %.

A final viscosity of 6500 mPas (measured with Brookfield RV measuring instrument using spindle 4, 20 rpm, at 25° C.) was then established by admixing a thickening agent (Matco TR 10 acrylate thickener, from Matco).
Formulation 2 (F2):

Like F1, but with 800 parts by weight of chalk (Carbocia 80, Carbocia). Additional water was added in a quantity resulting in carpet coating compositions having a solids content of 81.5 wt %.

A final viscosity of 6500 mPas (measured with Brookfield RV measuring instrument using spindle 4, 20 rpm, at 25° C.) was established with admixture of a thickening agent (Matco TR 10 acrylate thickener, from Matco).
Formulation 3 (F3):

Like F1, but with 250 parts by weight of chalk (Carbocia 80, Carbocia). Additional water was added in a quantity resulting in carpet coating compositions having a solids content of 81.5 wt %. A final viscosity of 6500 mPas (measured with Brookfield RV measuring instrument using spindle 4, 20 rpm, at 25° C.) was established with admixture of a thickening agent (Matco TR 10 acrylate thickener, from Matco).
Production of Carpets PA and PP:

The particular carpet coating composition described above (formulations 1 to 3) was frothed for up for 3 minutes using a kitchen appliance to obtain foam densities of 950 to 1015 g/l.
Carpet PA:

A Helsinki 151 greige loop pile tufted carpet from Edel (100% polyamide (hereinafter PA); 550 g/m$^2$ pile weight) 38 cm×33 cm in size was uniformly precoated with 148 g of the particular frothed carpet coating composition.

This was followed by the application, and uniform spreading, of 60 g of a frothed carpet coating composition F1 to F3 as a secondary coating. A textile backing (Action Back polypropylene weave) was then placed on top and worked in twice with a 1.6 kg roller without pressure. Drying was done in an oven at 130° C. for 20 minutes.
Carpet PP:

A Puma 182 greige loop pile tufted carpet from Edel (100% polypropylene (hereinafter PP); 550 g/m$^2$ pile weight) 38 cm×33 cm in size was uniformly precoated with 148 g of the particular frothed carpet coating composition.

This was followed by the application, and uniform spreading, of 60 g of a frothed carpet coating composition F1 to F3 as a secondary coating. A textile backing (Action Back polypropylene weave) was then placed on top and worked in twice with a 1.6 kg roller without pressure. Drying was done in an oven at 130° C. for 20 minutes.

Methods for Testing the Carpets:
Measurement of Tuft Withdrawal Force:

Testing of the tuft withdrawal force was done in accordance with ISO 4919 using a Zwick tester at 23° C. and 50% relative humidity. The particular carpet was clamped in the top part on the base of the measuring device and a needle was threaded into a carpet loop. The force needed to pull a loop out of the carpet was determined on ten different carpet loops. The mean of the measured results was reported as the dry tuft withdrawal force.

To determine the wet tuft withdrawal force, samples as prepared for determining the dry tuft withdrawal force were placed in water for 10 min and, before further testing, surficially dabbed dry and thereby freed of surplus water.

The dry tuft withdrawal force and the wet tuft withdrawal force are a measure of the quality of the tuft bind provided by the precoat and of the wear properties of the carpet surface. They should therefore be as high as possible.

Measurement of Delamination Resistance:

Delamination resistance was determined in accordance with DIN EN ISO 11857 using a Zwick tester at 23° C. and 50% relative humidity. Three samples were prepared by cutting strips 5 cm wide and 20 cm long out of the particular carpet in the machine direction and delaminated by hand on the narrow side over a length of 20 cm. Each incipiently delaminated sample was clamped into a Zwick tester and the secondary backing was separated from the carpet at a rate of 300 mm/min. The overall mean of five samples was determined in accordance with DIN EN ISO 11857 from the means of the peak values of each sample in the admissible range of measurement. In effect, the first 25% of the particular measuring curve was marked and ignored for the purposes of evaluation. The next 50% of the diagram trace was divided into 5 equal sections and from each of these the particular peak value was determined. The peak values were used to calculate a mean and the means were in turn used to calculate the overall mean. Delamination resistance was reported in newtons [N].

To determine the wet delamination, resistance, samples as prepared for determining the dry delamination resistance were placed in water for an additional 10 min and, before further testing, surficially dabbed dry and thereby freed of surplus water.

EXAMPLE 1

In Example 1, formulation F1 with dispersion A as binder was additionally admixed with 0.5% (1.A), 1% (1.B), 3% (1.C) and 5% (1.D), based in each case on the dry weight of the vinyl acetate-ethylene copolymer, of a polyethyleneimine (LUPASOL FG, BASF, average molecular weight 800 g/mol). Carpet PA was tested. Table 1 summarizes the results of testing.

EXAMPLE 2

Like Example 1, but with the polyethyleneimine LUPASOL G20 (LUPASOL G20, BASF, average molecular weight 1300 g/mol). Table 1 summarizes the results of testing.

EXAMPLE 3

Like Example 1, but with the polyethyleneimine LUPASOL HF (LUPASOL HF, BASF, average molecular weight 25 000 g/mol). Table 1 summarizes the results of testing.

EXAMPLE 4

Like Example 1, but with the polyethyleneimine LUPASOL P (LUPASOL P, BASF, average molecular weight 750 000 g/mol) based on the dry weight of the vinyl acetate-ethylene copolymer used. Table 1 summarizes the results of testing.

COMPARATIVE EXAMPLE

Like Example 1, but without addition of any polyethyleneimine. Table 1 summarizes the results of testing.

TABLE 1

Examples 1 to 4 on carpet PA with formulation F1 and dispersion A.

| Ex. | w (Mod) [wt %] | Delamination resistance | | | Tuft withdrawal force | |
|---|---|---|---|---|---|---|
| | | dry [N] | wet [N] | Ref/Mod* [%] | dry [N] | wet [N] |
| Comp. Ex. | 0 | 31.3 | 8.8 | — | 37.5 | 22.1 |
| 1.A | 0.5% | 35 | 17.1 | 193 | 34.7 | 24.4 |
| 1.B | 1% | 36.7 | 17.4 | 196 | 39.9 | 24.9 |
| 1.C | 3% | 28 | 15.5 | 175 | 42.9 | 25.5 |
| 1.D | 5% | 30.5 | 14.1 | 159 | 45.9 | 28.1 |
| 2.A | 0.5% | 38.7 | 14.3 | 161 | 46 | 24.2 |
| 2.B | 1% | 41.8 | 17.8 | 201 | 28.3 | 22.0 |
| 2.C | 3% | 37.9 | 20.8 | 234 | 30.5 | 21.5 |
| 2.D | 5% | 27.7 | 12.8 | 144 | 47 | 28.0 |
| 3.A | 0.5% | 49.8 | 24.2 | 273 | 33.3 | 22.9 |
| 3.B | 1% | 41 | 22.2 | 250 | 37.6 | 23.2 |
| 3.C | 3% | 37.4 | 15.9 | 179 | 42.9 | 27.4 |
| 3.D | 5% | 43.5 | 16.6 | 187 | 43.9 | 24.3 |
| 4.A | 0.5% | 44.6 | 23.9 | 269 | 33.4 | 21.2 |
| 4.B | 1% | 36.8 | 20.3 | 229 | 44.5 | 29.3 |
| 4.C | 3% | 45.2 | 24.6 | 277 | 39.4 | 24.2 |
| 4.D | 5% | 47.1 | 19.4 | 219 | 42.5 | 27.8 |

(*= ratio of the wet delamination resistance of modified formulation to that of unmodified reference, in percent)

From the results of testing it is clear that the wet properties in tuft withdrawal and delamination resistance are significantly improved for the dispersion A with mixed stabilization, especially with relatively high molecular mass polyethyleneimine.

EXAMPLES 5 TO 7

In examples 5 to 7, testing was carried out, in each case on polyamide carpet PA or polypropylene carpet PP, and in each case with addition of polyethyleneimine or without addition of polyethyleneimine,
in Examples 5.A, 5.B, 5.C and 5.D, on the formulation F1 with the dispersion A,
in Examples 6.A, 6.B, 6.C and 6.D, on the formulation F1 with the dispersion B,
in Examples 7.A, 7.B, 7.C and 7.D, on the formulation F1 with the dispersion C.

In each of these cases, 1 wt % of the polyimine Lupasol P (Lupasol P, BASF, average molecular weight 750 000 g/mol) was added, based in each case on the dry weight of the vinyl acetate-ethylene copolymer.

The mechanical testing results can be found in Table 2.

The results summarized in Table 2 demonstrate the effect of the improvement in use mechanical properties particularly after wet storage. Particularly pronounced is the increase in the delamination resistance and in the tuft withdrawal force in the case of dispersion C. Dispersion B as well, as a purely polyvinyl alcohol-stabilized vinyl acetate-ethylene copolymer dispersion, shows a considerable improvement in the delamination resistances (wet). For the partially stabilized dispersion A, the improvement is obtainable primarily in the tuft withdrawal measurements.

TABLE 2

1 wt % polyethyleneimine of MW 750 000 g/mol (Lupasol P) in formulation F1 with dispersion A (Ex. 5. A-5.D), dispersion B (Ex. 6.A-6.D) and dispersion C (Ex. 7.A-7.D) on carpets PA and PP.

| Ex. | w (Mod) [wt %] | Carpet | Delamination resistance wet [N] | Ref/Mod* [%] | Tuft withdrawal force wet [N] | Ref/Mod* [%] | Thickener [g/100 g] |
|---|---|---|---|---|---|---|---|
| 5.A | — | PA | 16.9 | | 19.2 | | 6.9 |
| 5.B | 1% | PA | 15.5 | 92 | 28.8 | 150 | 7.4 |
| 5.C | — | PP | 20 | | 21 | | 6.9 |
| 5.D | 1% | PP | 15.7 | 79 | 23.3 | 111 | 7.4 |
| 6.A | — | PA | 12.7 | | 21.8 | | 7.9 |
| 6.B | 1% | PA | 21 | 165 | 28.4 | 130 | 6.1 |
| 6.C | — | PP | 15.1 | | 22.9 | | 7.9 |
| 6.D | 1% | PP | 21 | 139 | 21.7 | 95 | 6.1 |
| 7.A | — | PA | 10 | | 21.7 | | 11 |
| 7.B | 1% | PA | 20 | 200 | 24.8 | 114 | 7.6 |
| 7.C | — | PP | 8 | | 22.9 | | 11 |
| 7.D | 1% | PP | 20.3 | 254 | 29.9 | 131 | 7.6 |

*Ratio of the wet delamination resistance or wet tuft withdrawal force of modified formulation to that of unmodified reference for the respective carpet PA or PP, in percent.

EXAMPLES 8 AND 9

In Example 8 and Example 9, for one precoat in each case, formulation 2 was need with dispersion B and 1 wt %, based in each case on the dry weight of the vinyl acetate-ethylene copolymer, of polyethyleneimine (Lupasol P, BASF, average molecular weight 750 000 g/mol).

For the secondary coating, formulation 3 was used with dispersion C and 1 wt %, based in each case on the dry weight or the vinyl acetate-ethylene copolymer, of polyethyleneimine (Lupasol P, BASF, average molecular weight 750 000 g/mol).

The form of application for the carpets PA and PP was either wet/dry—preliminary drying or the precoat and subsequent application of the secondary coating—or wet/wet—no preliminary drying of the precoat before subsequent application of the secondary coating.

The results of the mechanical testing are summarized in Table 3.

TABLE 3

1 wt % polyethyleneimine in formulation F2 with dispersion B in the precoat (F2) and 1 wt % polyethyleneimine in formulation F3 with dispersion C in the secondary coating (F3) on the carpets PA and PP. The mode of application is differentiated as wet/dry and wet/wet.

| Ex. | Application | Carpet | w (Mod) [wt %] | Delamination resistance wet [N] | Ref/Mod* [%] | Tuft withdrawal force wet [N] | Ref/Mod* [%] |
|---|---|---|---|---|---|---|---|
| 8.A | wet/dry | PA | — | 2.2 | | 6.6 | |
| 8.B | wet/dry | PA | 1% | 7.6 | 345 | 11.7 | 177 |
| 8.C | wet/dry | PP | — | 2.2 | | 12.2 | |
| 8.D | wet/dry | PP | 1% | 11 | 500 | 23.3 | 191 |
| 9.A | wet/wet | PA | — | 4 | | 8.41 | |
| 9.B | wet/wet | PA | 1% | 13 | 325 | 11.4 | 135 |
| 9.C | wet/wet | PP | — | 3.9 | | 12.6 | |
| 9.D | wet/wet | PP | 1% | 14.7 | 377 | 20.0 | 166 |

*Ratio of the wet delamination resistance or wet tuft withdrawal force of modified formulation to that of unmodified reference for the respective carpet PA or PP, in percent.

From the results for Examples 8 and 9 it is clear that for both carpet variants PP and PA, both for the wet/dry and the wet/wet modes of application, considerable improvements are achieved in the wet delamination resistances with addition of polyethyleneimine. Here, particularly in the case of the critical mode of application with preliminary drying of the precoat (wet/dry), a significant increase was achieved in the delamination resistances and tuft withdrawals after wet storage, of up to 500%.

Fundamentally, improvements in the wet properties can be achieved by addition of polyethyleneimine, both for the PA and for the PP carpets.

The invention claimed is:

1. A method of producing a carpet, comprising the steps of:
   a. applying a carpet coating composition comprising as binders an aqueous dispersion of a vinyl acetate-ethylene copolymer and at least one polyethyleneimine to either or both of:
      i. a reverse side of a carpet pile comprising carpet fibers inserted into a woven or laid primary backing; or
      ii. a secondary carpet backing comprising woven natural or synthetic fibers; and
   b. attaching the carpet pile to the secondary carpet backing,
   wherein the vinyl acetate-ethylene copolymer is stabilized by at least one emulsifier and/or at least one polyvinyl alcohol protective colloid, wherein the polyvinyl alcohol or polyvinyl alcohols consist of partially hydrolyzed polyvinyl alcohols having an 80 to 95 mol % degree of hydrolysis and a Hoeppler viscosity in 4% aqueous solution of 1 to 40 mPas.

2. The method of claim 1, further comprising forming the vinyl acetate-ethylene copolymer by radical-initiated emulsion polymerization of 60 to 98 wt % of vinyl acetate and 2 to 30 wt % of ethylene, based in each case on the total weight of the comonomers, in an aqueous medium, the particulars in wt % adding up to 100 wt % in each case.

3. The method of claim 1, wherein the emulsion polymerization of the vinyl acetate-ethylene copolymer takes place in the presence of a protective colloid, in the presence of an emulsifier, or in the presence of a protective colloid and an emulsifier.

4. The method of claim 1, wherein the polyethyleneimine has a weight-average molecular weight of 500 g/mol to 1,000,000 g/mol.

5. The method of claim 4, wherein the polyethyleneimine has a weight-average molecular weight of 10,000 g/mol to 1,000,000 g/mol.

6. The method of claim 1, wherein the polyethyleneimine is included in the carpet coating composition in an amount of 0.1 to 10 wt %, based on the dry weight of the vinyl acetate-ethylene copolymer.

7. The method of claim 1, wherein the carpet coating composition comprises:
- an aqueous dispersion of a vinyl acetate-ethylene copolymer;
- 0.1 to 10 wt % of at least one polyethyleneimine, based on the dry weight of the vinyl acetate-ethylene copolymer (dry/dry);
- 100 to 1400 wt % of fillers, based on the dry weight of the vinyl acetate-ethylene copolymer (dry/dry);
- water;
- optionally one or more additives; and
- optionally one or more adjuvants,
- wherein the fillers consist of one or more selected from the group consisting of kaolin, talc, fluorspar, fly ash, aluminum trihydrate, and chalk.

8. The method of claim 1, wherein the carpets are tufted carpets, woven carpets, or needlefelt carpets.

* * * * *